US005245116A

United States Patent [19]

Bontron et al.

[11] Patent Number: 5,245,116

[45] Date of Patent: Sep. 14, 1993

[54] PROCESS FOR THE WET TREATMENT OF SPENT POT LININGS FROM HALL-HEROULT ELECTROLYTIC CELLS

[75] Inventors: Jean-Claude Bontron, Aix-en-Provence; Pierre-Bernard Personnet, Saint-Jean-de-Mauriene; Jean-Michel Lamerant, Bouc Bel Air, all of France

[73] Assignee: Aluminium Pechiney, Courbevoie, France

[21] Appl. No.: 793,114

[22] Filed: Nov. 18, 1991

[30] Foreign Application Priority Data

Nov. 16, 1990 [FR] France .............................. 90 14825

[51] Int. Cl.[5] ......................... A62D 3/00; C01F 7/00; C25C 3/06

[52] U.S. Cl. .................................... 588/248; 423/111; 423/127; 423/131; 423/185; 423/DIG. 20; 204/67

[58] Field of Search ............... 423/111, 127, 131, 167, 423/184, 185, DIG. 20; 588/248; 204/67

[56] References Cited

U.S. PATENT DOCUMENTS

| | | | |
|---|---|---|---|
| 4,113,831 | 9/1978 | Orth, Jr. et al. | 423/119 |
| 4,113,832 | 9/1978 | Bell et al. | 423/133 |
| 4,447,740 | 4/1984 | Snodgrass | 423/119 |
| 4,576,651 | 3/1986 | Peutschman | 134/25.5 |
| 4,816,122 | 3/1989 | Lever | 423/131 |
| 4,889,695 | 12/1989 | Bush | 423/132 |

FOREIGN PATENT DOCUMENTS

| | | |
|---|---|---|
| 0117761 | 9/1984 | European Pat. Off. . |
| 2056425 | 3/1981 | United Kingdom . |

*Primary Examiner*—Gary P. Straub

*Attorney, Agent, or Firm*—Dennison, Meserole, Pollack & Scheiner

[57] ABSTRACT

A process for the treatment of spent pot linings impregnated with alkali metal cyanide and fluoric products by grinding previously crushed pot linings in the presence of lime, suspending the ground pot linings in an aqueous medium in order to precipitate a flux in the form of $CaF_2$ accompanied by the release of soda, followed by the heating of the suspension at a temperature $T > 140°$ C. in the presence of clay to form, after fixing the free soda, insoluble synthetic silicate compounds of the feldspathoid or zeolite type and finally the separation by filtration of the resulting solid phase from the liquid phase, which liquid phase is recycled to form a new ground pot lining suspension.

17 Claims, 1 Drawing Sheet

PROCESS FOR THE WET TREATMENT OF SPENT POT LININGS FROM HALL-HEROULT ELECTROLYTIC CELLS

FIELD OF THE INVENTION

The invention relates to a wet treatment process for spent pot linings more particularly resulting from the dismantling of cells for the production of aluminium by electrolysis using the Hall-Heroult method. It is pointed out that an aluminium production plant with an annual capacity of 240,000 t produces approximately 4000 t/year of spent pot linings, which are constituted by carbon-containing cathode blocks, joints and lateral linings made from carbon-containing paste, as well as all refractories and insulants located on side walls and the bottom of the metal chamber forming the electrolytic cell. After use, these lining products are highly impregnated with noxious substances, such as soluble sodoaluminous or sodium fluorides and cyanides, which it is necessary to insolubilize or destroy prior to discharge or reuse.

DESCRIPTION OF RELATED ART

Heat treatment processes generally operating in a fluidized bed and based either on pyrohydrolysis at more than 1000° C. of the spent pot linings in accordance with the Elkem U.S. Pat. No. 4,065,551, or the Kaiser U.S. Pat. Nos. 4,113,832 and 4,116,809, or by combustion in air or an oxidizing atmosphere of the carbon elements at a temperature of approximately 800° C., which is sufficient to decompose the cyanides without leading to a significant release of volatile fluoric components according to the Reynolds U.S. Pat. No. 4,053,375 or the article by L.C. Blayden and S.G. Epstein, Journal of Metals, July 1984, p. 24.

All processes and apparatuses adopting a thermal procedure have limited possibilities as a result of the nature and composition of the spent pot linings to be treated. Thus, due to the melting of certain eutectic compounds forming during combustion, the particles of the pot linings have a marked agglomeration tendency. It rapidly becomes impossible to prevent their agglomeration and consequently maintain a fluidized bed, a fortiori a dense bed, if combustion is e.g. carried out in a rotary kiln with a long residence time. This already significant agglomeration phenomenon in the case of pot lining charges constituted solely by carbon-containing products is greatly accentuated with charges containing refractory oxides and in particular silica, whose weight content must not exceed 3 or 4%, as can be gathered from the article by E.R. Cutshall and L.O. Daley, Journal of Metals, November 1986, p.37, Table II.

Wet treatment processes for spent pot linings, particularly involving an alkaline medium are also known. Most of these treatments consist of soda or sodium carbonate leaching of the previously sorted and crushed carbon-containing pot linings with a view to solubilizing the fluoric compounds in the form of NaF and the aluminous compounds in the form of sodium aluminate, or for separately valorizing these products (U.S. Pat. No. 4,113,831) or by then coprecipitating them in the presence of $CO_2$ in the cryolite state (U.S. Pat. Nos. 2,732,283 and 3,106,448). These valorization forms only have limited prospects of success at aluminum production sites and in particular suffer from the disadvantage, as in the thermal processes, of leaving unsolved the problem of insolubilization prior to storage or discharging of the solid, non-carbon residues.

It is much easier to insolubilize fluoric compounds by lime leaching of ground pot linings with precipitation of $CaF_2$ and the formation of soda, which dissolves in the same way as certain alumina-containing compounds, which is converted into $AlO_2Na$, which can be recycled in a Bayer process. Thus, according to GB 2 056 425, following the separate grinding or milling of the carbon and non-carbon fractions, there is a separate valorization of the insoluble products following leaching with lime and with in particular the recycling of the carbon parts as pot linings and the recovery of $CaF_2$ as a hydrofluoric acid source. Although the above criticism still applies to this type of process which, although more economic to perform, remains dependent on the possibilities of recycling the leaching products of the aluminum production sites, it should be notes that the insolubilization of fluorides by precipitation in the $CaF_2$ state is never complete from the time when the free soda content resulting from the reaction becomes sufficiently high to reduce the solubility of the alkali metal fluorides and in particular NaF in the solution and consequently their $CaF_2$ conversion efficiency. Thus, during tests controlling the insolubilization by leaching of insoluble residues, it has been possible to detect fluorine contents in the form of soluble fluorides up to 1% by weight of the residues, preventing any discharging of non-recycled fractions and in particular the non-carbon fraction of said residues.

Knowing that spent pot linings contain large amounts of fluoric derivatives (up to 200 kg of fluorine per tonne), sodium products (up to 200 kg of Na per tonne), non-negligible cyanide quantities (up to 10 kg per tonne) and that these environmentally noxious elements are encountered both in the carbon-containing part of the inner lining of the electrolytic cell and in the part of the silico-aluminous briquetting constituting the thermal insulating lining of modern cells, it has proved necessary to conceive an industrial process, which is able to treat under economic conditions the said spent pot linings, no matter what their composition and in particular their silica and alumina contents, whilst offering all the necessary safety for the environment, i.e. ensuring during treatment a total decomposition of the cyanides and a quasi-complete insolubilization of the fluorides, together with the associated alkali metals.

SUMMARY OF THE INVENTION

The process according to the invention relates to a wet insolubilization treatment of spent pot linings with a view to their storage or discharge. These pot linings having a variable composition are constituted by carbon-containing products (30 to 50% by weight), but also refractory elements, generally of the silico-aluminous type, impregnated with cyanides (CN $\leqq$1% by weight), fluoric components (F $\leqq$20%), generally of an alkaline nature, sodium (Na $\leqq$20%), mainly in the NaF state.

The invention more specifically relates to a process for the wet treatment of previously ground spent pot linings by the attack of calcium, more particularly with a view to insolubilizing in the $CaF_2$ state the fluorine of the impregnation compounds of these pot linings, characterized by the three following main stages:

grinding takes place, preferably in an aqueous medium, of the previously crushed, miscellaneous spent pot linings, in the presence of an adequate quantity of lime to combine with all the fluorine contained and a suspension is formed in an aqueous medium, which is kept in an agitated state for a sufficient time to bring about the precipitation in $CaF_2$ form of the alkali metal fluorides, with the release of soda;

the suspension is then heated to a temperature of $T>140°$ C. in the presence of an adequate quantity of clay to fix the free soda by the formation of an insoluble synthetic compound and the said suspension is then cooled;

the solid residue, constituted by the unattached pot lining elements, the $CaF_2$ precipitate and the insoluble synthetic compound, is separated from the mother liquors and after washing with water the residue is discharged, whereas the mother liquors and the wash waters are combined for recycling to the first two stages of the process.

DETAILED DESCRIPTION OF THE INVENTION

The process according to the invention is based on the finding that it is possible to recombine, with readily available, inexpensive addition products, virtually all the fluorine of the fluoric compounds impregnating the spent pot linings, as well as the free soda produced in the causticization reaction, in order to form easily filtrable insoluble compounds, whilst the compounds which remain soluble, such as cyanides and generally in the sodium cyanide state, are separated under temperature and pressure conditions chosen in such a way as to bring about these insolubilization In order to achieve these results, a certain number of essential operating conditions must be respected.

Thus, the reactions of the lime with the main fluoric compounds NaF, $AlF_3$ and $Na_3AlF_6$ systematically lead to the precipitation of $CaF_2$, such as for example:

$$2AlF_3 + 3Ca(OH)_2 \rightarrow 2Al(OH)_3 + 3CaF_2\downarrow$$

$$2NaF + Ca(OH)_2 \rightarrow 2NaoH + CaF_2\downarrow$$

$$Na_3AlF_6 + 3Ca(OH)_2 \rightarrow 2NaOH + AlO_2Na + 3CaF_2\downarrow + 2H_2O$$

However, for obtaining a quasi-complete precipitation of the fluorine ions in $CaF_2$, to use a 5 to 25% by weight lime excess based on the stoichiometric quantities.

Moreover, the soda released by the calcium attack of the alkali metal chlorides tends to react hot with certain insoluble aluminous compounds in order to form sodium aluminate. It is also preferable to carry out lime leaching at a temperature of $t<80°$ C. and in a sufficiently dilute medium, preferably with a dry matter concentration below 500 g per liter of suspension.

In order to improve the kinetics of the reactions which consequently take place at a relatively low temperature, by grinding or milling it is appropriate to obtain a large division state of the spent pot linings previously crushed in the form of blocks with a size smaller than 250 mm, so that the mixture of particles of pot linings and lime, once milling has taken place, reaches a grain size between 0 and 1 mm. This milling preferably takes place in a wet medium constituted by the recycled liquor from the mixture of mother liquors and wash waters, so that the $CaF_2$ precipitated on the surface of ground pot lining grains is eliminated as it forms, thus avoiding any slowing down or blocking of the reaction within the grains.

In the following stage the hot fixing of the soda by a clay in order to form an insoluble synthetic compound is e.g. carried out by kaolinite ($2SiO_2$, $Al_2O_3$, $2H_2O$) in the natural kaolin state, accompanied by the formation of insoluble feldspathoids such as hydroxysodalite and in accordance with the following reaction:

$$3(2SiO_2, Al_2O_3, 2H_2O) + 8NaOH \rightarrow 3Al_2O_3, 6SiO_2, 4Na_2O, H_2O + 9H_2O$$

which requires at least 2.42 kg of kaolinite per kg of free soda.

Obviously the free soda quantity varies as a function of the chemical composition of the pot linings and the proportion of ground pot linings in the suspension. In practice, the kaolinite addition is regulated between 0.12 and 0.20 kg/kg of suspension, whose weight composition, for the sodium contents in spent pot linings generally between 10 and 15% by weight, varies within the following proportions:

| | |
|---|---|
| Ground pot linings <5 mm | 20 to 30% |
| Slaked lime | 4 to 7% |
| Recycled liquor or water | 63 to 76% |

Apart from kaolinite, among the main clays which can be used are illite and smectites such as montmorillonite and bentonite which, by fixing the free soda, lead to the formation of a mixture of insoluble zeolites (analcite and the Na-Pt zeolite). In more general terms, the thus formed mixtures are synthetic zeolites or feldspathoids.

During this sodium insolubilization stage, reference is also made to the importance of the reaction times between 10 minutes and 4 hours and preferably between 30 minutes and 3 hours, but more particularly the reaction temperature which must exceed 140° C. and is preferably between 180° and 250° C. The temperature rise aids on the one hand the reaction in the sense of converting the clay into an insoluble synthetic compound by fixing the free soda and on the other the decomposition of the cyanides by hydrolysis in accordance with the basic reaction $$CN^- + 2H_2O \rightarrow NH_3 + HCOO^-$$

The temperature rise finally favours the formation of precipitates having a "permeable" texture, i.e. which can be easily filtered and washed.

In the final stage of separation by filtration of the solid residue from the mother liquors, reference is made to the excellent permeability of the solid cake, which can be effectively washed with a relatively small water volume, because the "wash ratio", i.e. the volume of water necessary for washing related to the water volume impregnating the wet cake after draining is substantially 1. After filtration and washing, the mother liquors and wash waters are combined to form a slightly alkaline liquor, which is recycled to the first two stages of the process for the preparation of suspensions of pot linings and lime on the one hand and kaolin on the other.

The fact that the process does not give rise to any liquid discharges, because it loses an impregnation liquid volume in the drained cake equivalent to the volume of injected wash waters, makes it possible to obviate the problem of storage and specific treatment of the excess wash wates containing the soluble impurities. In the present case, the slightly alkaline liquor resulting from the combination of the mother liquors and the wash waters is entirely recycled.

The wet residue is subject to a leaching test according to French standard X 31-210 for determining the cyanide, sodium and fluorine contents. The CN weight content must remain below 0.01% and the fluorine content must be below a limit which varies, according to the national standards in force, between 0.05 and 0.3%.

The following table 1 summarizes the most significant characteristics of comparative autoclave treatment tests for 3 hours and at different temperatures of 145°, 180° and 220° C. with respect to three samples of 2 kg of a miscellaneous ground spent pot lining suspension, whose fluorine and sodium contents were respectively 10.1 and 14.9%. The weight composition of the 2 kg samples was 0.47 kg of pot linings, 0.1 kg of slaked lime and 1.43 kg water. The added kaolin proportion was 0.15 kg/kg of suspension. After treatment in the autoclave, the suspension was cooled below 100° C. and filtered under a vacuum of 500 mm Hg.

TABLE 1

| Test No. | | 1 | 2 | 3 |
|---|---|---|---|---|
| Autoclaving T °C. | | 145 | 180 | 220 |
| Filtration Rate m/h | | 0.49 | 1.16 | 1.77 |
| Wash ratio | | 1.9 | 1.5 | 1.4 |
| Washing speed m/h | | 0.58 | 1.1 | 1.43 |
| Filtrate analysis | $Na_2O$ g/l | 22.1 | 11.4 | 5.3 |
| Mother liquor | $Na_2O$ g/l | 1.42 | 0.925 | 0.72 |
| Filtrate analysis | $Na_2O$ g/l | 11.6 | 7.6 | 3.6 |
| Wash water | F g/l | 1.04 | 0.77 | 0.54 |
| Tonnes of dry residue per $m^2$/hour | | 0.13 | 0.21 | 0.29 |

it is possible to see the influence of the increase of the autoclaving temperature both on the reduction of the free soda content expressed in $Na_2O$ resulting from a higher hydroxysodalite transformation level, on the filtration and washing speed increases and on the dry state residue tonnage which can be treated per $m^2$ of filtration surface and per hour.

The following table 2 summarizes for three identical tests, on the one hand the results of checks on the distribution of the pollutants F and Na in the solid residues and in the recycled liquors (mother liquors and wash water) and on the other hand the results of leaching tests on dry residues in accordance with French standard X31-210.

TABLE 2

| Test No. | 1 | 2 | 3 |
|---|---|---|---|
| Temperature °C. | 145 | 180 | 220 |
| F residue % | 93.07 | 95.55 | 96.94 |
| F liquor % | 6.93 | 4.45 | 3.06 |
| Na residue % | 57.28 | 77.55 | 90.02 |
| Na liquor % | 45.72 | 22.45 | 9.98 |
| Dry residue leaching, content of leachable elements | | | |
| F % | 0.11 | 0.09 | 0.1 |
| Na % | 0.17 | 0.18 | 0.18 |
| CN % | <0.01 | <0.01 | <0.01 |

It is confirmed that for autoclaving temperatures about 200°0 C., the fluorine and in particular sodium contents of the insoluble residue increase, whereas conversely they decrease in the liquor, more particularly due to a better hydroxysodalite conversion level. The leaching tests on dry residues are more particularly satisfactory with respect to cyanides.

BRIEF DESCRIPTION OF THE DRAWING

The sole drawing FIGURE is a flow chart showing the process elements in the invention.

EXAMPLE

Figure 1:
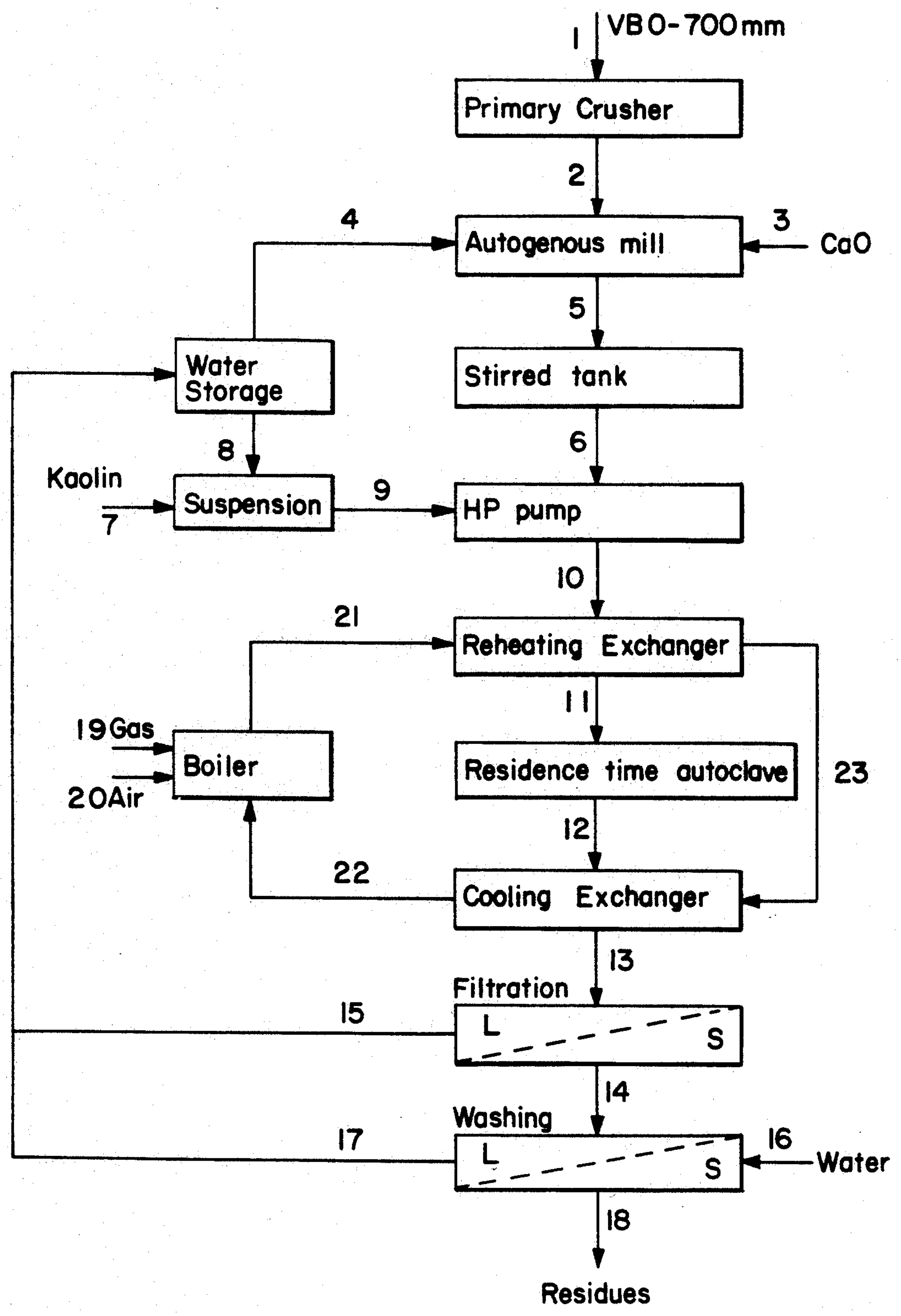

The invention will be better understood from the description of its industrial performance in accordance with the following example and with reference to the process diagram of the FIGURE.

Three tonnes of spent pot linings resulting from the dry pot lining removal from aluminium electrolytic cells and forming a miscellaneous mixture 1 (silico-aluminous refractory + carbon-containing blocks) of grain size 0 to 700 mm were crushed, giving a product 2 with a grain size of 0 to 250 mm, whose fluorine, sodium, silicon and cyanide contents are respectively 9.2, 14.6, 11.1 and 0.12%.

An autogenous mill or grinder is then simultaneously supplied with the crushed product 2 at a rate of 1 t/h, quicklime 3 (grain size 0 to 10 mm) at a rate of 0.25 t/h and recycled liquor 4 at a rate of 4.0 $m^3$/h. The autogenous mill operates in closed circuit form on a screen having a 1 mm mesh. The suspension obtained 5 is stored in a tank stirred for on average 1 hours.

In parallel, preparation takes place of a 500 g/l suspension of crude kaolin 7 in recycled liquor 8. A high pressure pump delivers under 35 bars (3.5 MPa) the mixture of the suspensions of ground spent pot linings and lime, i.e. 4.6 $m^3$/h and kaolin 9, i.e. 1.9 $m^3$/h to a pressurized treatment installation comprising a monotubular reheating heat exchanger 11, where the suspension is heated to 220° C., an unheated, thermally insulated autoclave 12 with a residence time of 1 hours and a monotubular cooling heat exchanger 13, where the suspension is cooled to 100° C.

A heat transfer fluid passes in closed circuit form between the two exchangers and a boiler, where there is a topping up with thermal energy 21,22 and 23. The cooled suspension 13 is then filtered and the cake formed is washed on a belt filter. The mother liquors 5 and wash waters 17, representing a total of 5.5 $m^3$/h, are combined in a storage tank for forming the recycle liquor 4 and 6. The wash water 16, i.e. 3.1 $m^3$/h, compensates the water loss by impregnation of the residue.

The balance of the liquids and solids flowing to the filtration-washing station can be summarized as follows:

hourly entering volume : suspension + wash waters = $6.5+3.1=9.6$ $m^3$/h hourly exiting volume : mother liquors and wash waters + wet residue $=5.5+4.1=9.6$ $m^3$h.

It should be noted that the wet residue has a total weight of 5.5 tonnes, including 3.1 tonnes of water.

The check of the distribution of fluorine and sodium in the residue and the liquor (mother liquors and wash water) reveals:

| | | | |
|---|---|---|---|
| F residue % | 97.2 | Na residue % | 91.2 |
| F liquor % | 2.8 | Na liquor % | 8.8 |

The leaching test on samples of washed residues dried in the oven gave the following results:

F % : 0.09

Na % : 0.17

CN % : <0.01

These results confirm the effectiveness of the process for insolubilizing and trapping pollutants, which makes it possible to industrially treat significant quantities (1.5 t/hour) of spent pot linings under favourable economic conditions, bearing in mind the possibility of obviating any specific treatment of the wash waters, which are integrally recycled, and the use of readily available, inexpensive reagents, such as kaolin and lime.

What is claimed is:

1. Process for the wet treatment of crushed, fluoride impregnated spent pot linings by insolubilizing the fluoride as $CaF_2$, comprising the steps of:
   (a) grinding the crushed spent pot linings in the presence of a quantity of lime stoichiometrically adequate to combine with all fluoride therein and forming an aqueous suspension of said fluoride and lime which is kept in an agitated state for a sufficient time to bring about the precipitation of said fluoride as $CaF_2$, with the release of soda;
   (b) heating the aqueous suspension to a temperature of $T>140°$ C. in the presence of an adequate quantity of clay to fix the free soda by formation of an insoluble synthetic silicate compound and cooling the aqueous suspension containing said insoluble synthetic silicate; and
   (c) separating the cooled suspension into a solid residue of unreacted pot lining components, the $CaF_2$ precipitate and the insoluble synthetic silicate compound and a mother liquor, washing the residue with water and discharging the washed residue, and combining the mother liquor and the wash water for recycling to said step (a) for wet grinding and suspension formation.

2. Treatment process according to claim 1, where the spent pot linings contain, by weight $CN^- \leqq 1\%$, $F^- \leqq 20\%$ and $Na^+ \leqq 20\%$.

3. Treatment process according to claim 1, wherein the grain size of the crushed spent pot linings is between 0 and 250 mm.

4. Treatment process according to claim 1, wherein the mixture of particles of spent pot linings and lime, following grinding, has a grain size between 0 and 1 mm.

5. Treatment process according to claim 1, wherein the grinding of the crushed, spent pot linings is wet grinding carried out in an aqueous medium.

6. Treatment process according to claim 1, wherein the lime quantity used for precipitating the fluoride ions as $CaF_2$ exceeds by 5 to 25% by weight the stoichiometric quantity.

7. Treatment process according to any one of the claims 1,4,5 or 6, wherein the suspension comprises by weight 20 to 30% ground pot linings, 4 to 7% lime and 63 to 76% water.

8. Treatment process according to claim 1 wherein the temperature of the suspension, maintained agitated after grinding, is below 80° C.

9. Treatment process according to claim 1, wherein the solid residue is washed with a water volume equivalent to a volume of water retained by said solid residue after said separating.

10. Treatment process according to claim 1 or 9, wherein said mother liquor and wash water are combined to form a slightly alkaline liquor.

11. Treatment process according to claim 1, wherein a portion of said mother liquor and a portion of said wash liquor are combined and used to form a suspension of clay which is added to the suspension in step (b).

12. Treatment process according to claim 1, wherein the clay added to the suspension is selected from the group consisting of illite, kaolinite and smectites.

13. Treatment process according to claim 12, wherein the kaolinite ($2SiO_2$, $Al_2O_3$, $2H_2O$) is added to the suspension in a weight proportion of 012 to 0.20 kg of kaolinite/kg of suspension.

14. Treatment process according to claim 12 or 13, wherein the kaolinite quantity used is at least 2.42 kg/kg of free soda in the suspension.

15. Treatment process according to any one of the claims 12 or 13 wherein the kaolin-containing suspension is heated to a temperature T between 180° and 250° C.

16. Treatment process according to any one of the claims 12 or 13 wherein the kaolin-containing suspension is heated to said temperature T for between 10 minutes and 4 hours.

17. Treatment process of claim 16, wherein the suspension is heated between 30 minutes and 3 hours.

* * * * *